(12) United States Patent
Harslund et al.

(10) Patent No.: US 8,721,173 B2
(45) Date of Patent: May 13, 2014

(54) TEMPERATURE CALIBRATION DEVICE, A CALIBRATOR BLOCK, AND A METHOD FOR CALIBRATING A TEMPERATURE PROBE

(75) Inventors: Jan Haakon Harslund, Slangerup (DK); Jørgen Reinholdt Larsen, Skævinge (DK); Folke Galsgaard, Nivå (DK)

(73) Assignee: Ametek Denmark A/S, Allerod (DK)

( * ) Notice: Subject to any disclaimer, the term of this patent is extended or adjusted under 35 U.S.C. 154(b) by 69 days.

(21) Appl. No.: 13/201,958

(22) PCT Filed: Feb. 19, 2009

(86) PCT No.: PCT/EP2009/051970
§ 371 (c)(1),
(2), (4) Date: Sep. 20, 2011

(87) PCT Pub. No.: WO2010/094332
PCT Pub. Date: Aug. 26, 2010

(65) Prior Publication Data
US 2012/0000540 A1    Jan. 5, 2012

(51) Int. Cl.
*G01K 15/00* (2006.01)
(52) U.S. Cl.
USPC .............................................. 374/1
(58) Field of Classification Search
USPC .............................................. 374/1–4
See application file for complete search history.

(56) References Cited

U.S. PATENT DOCUMENTS

| | | | | |
|---|---|---|---|---|
| 2,406,080 A | * | 8/1946 | Laird | 165/265 |
| 3,263,740 A | * | 8/1966 | Bruce | 165/263 |
| 3,890,836 A | * | 6/1975 | McKenzie et al. | 73/168 |
| 4,398,836 A | * | 8/1983 | Sitek | 374/38 |
| 4,614,721 A | * | 9/1986 | Goldberg | 436/147 |
| 5,249,359 A | * | 10/1993 | Schubert et al. | 29/890.039 |
| 5,544,487 A | * | 8/1996 | Attey et al. | 62/3.7 |
| 6,007,239 A | * | 12/1999 | Nickol | 374/1 |
| 6,230,497 B1 | * | 5/2001 | Morris et al. | 62/3.7 |
| 6,688,119 B2 | * | 2/2004 | Holmes | 62/127 |
| 6,709,152 B1 | * | 3/2004 | Bronlund | 374/3 |
| 2004/0194924 A1 | * | 10/2004 | Wong | 165/80.3 |
| 2007/0289314 A1 | * | 12/2007 | Liebmann et al. | 62/3.3 |
| 2007/0291814 A1 | * | 12/2007 | Hirst | 374/1 |
| 2009/0064603 A1 | | 3/2009 | James et al. | |

OTHER PUBLICATIONS

International Search Report for corresponding International Application No. PCT/EP2009/051970 dated Nov. 5, 2009.
Written Opinion for corresponding International Application No. PCT/EP2009/051970 dated Nov. 5, 2009.

* cited by examiner

*Primary Examiner* — Lisa Caputo
*Assistant Examiner* — Nasir U Ahmed
(74) *Attorney, Agent, or Firm* — Renner, Otto, Boisselle & Sklar, LLP.

(57) ABSTRACT

A temperature calibration device 1, comprising a calibrator block 3 having a cavity 4 and one or more heating elements and at least one temperature sensor being thermally coupled to the calibrator block 3, and where the heating elements and the temperature sensor is connected to a control system being adapted for controlling the temperature of the calibrator block 3, and where the calibrator block 3, at least partly, is surrounded by thermally insulating material 5. A number of channels 9 are arranged in the calibrator block 3 or the insulation material 5, and being connected to a gas supply 6, and where the control system is adapted for activating or deactivating the gas supply.

15 Claims, 2 Drawing Sheets

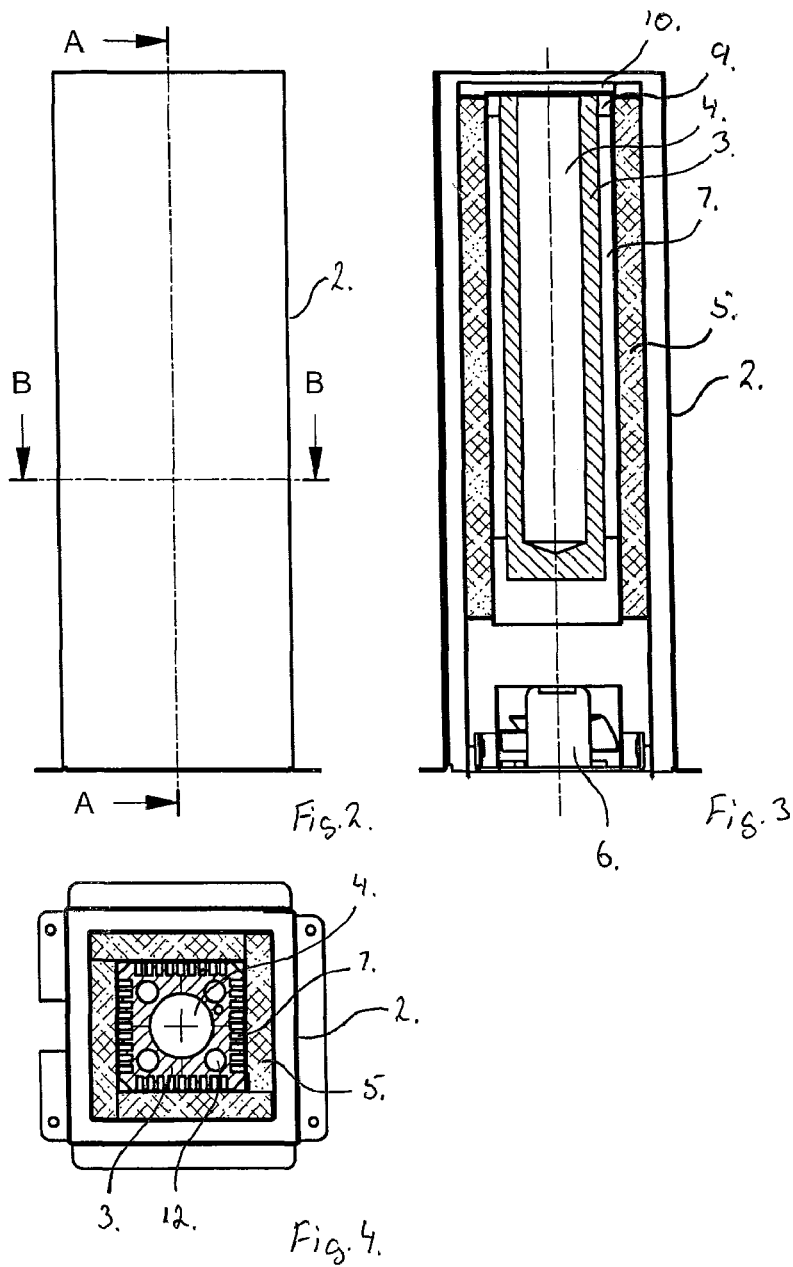

TEMPERATURE CALIBRATION DEVICE, A CALIBRATOR BLOCK, AND A METHOD FOR CALIBRATING A TEMPERATURE PROBE

The present invention relates to calibration of temperature probes and more specifically to a temperature calibration device of the so called dry well type, comprising a calibrator block having a cavity and one or more heating elements and at least one temperature sensor being thermally coupled to the calibrator block, and where the heating elements and the temperature sensor is connected to a control system being adapted for controlling the temperature of the calibrator block, and where the calibrator block, at least partly, is surrounded by insulation means for thermally insulating the calibrator block.

DESCRIPTION OF RELATED ART

Temperature calibration devices are well known for calibrating high-precision temperature probes, and very often copper is today used for the calibration block because copper has good heat conductivity. Normally the copper material is covered with another material in order to avoid corrosion. In these calibration devices the calibration block is exposed to the free, and a blower is often used to increase cooling of the exposed calibration block after each calibration process.

A common problem, however, relating to the use of calibrator blocks based on copper is that they may corrode especially at high temperatures, and that e.g. the covering may crack, so that the use of specific materials for the calibrator block may limit the temperatures at which the probes can be tested. Therefore it has been a challenge to find materials for the calibrator block that can be heated to ever higher temperatures without giving rise to problems such as corrosion or other practical problems.

In this relation US patent application no. 2007/0291814 suggests to use an aluminium-bronze alloy for the calibration block. The aluminium-bronze alloy comprises less than 8.5 weight percent (wt %) of aluminium, and has a microstructure that contains only alpha phase. In order to ensure a high degree of temperature homogeneity it is however necessary to provide heat insulation surrounding major parts of the calibration block, but this has, in combination with the relatively poor heat conducting properties of this material resulted in that these calibration devices require a very long time for cooling the calibrator block between the calibration processes.

SUMMARY OF THE INVENTION

The main object of the present invention is therefore to provide an improved calibration device being able to work at much higher temperatures than the prior copper based devices, and on the other hand providing reduced time for cooling between calibration processes.

At least this object is achieved by a device and a method according to the main claim 1, specifying that channels, according to the invention are arranged in the calibrator block or the insulation means, and being connected to a gas supply, and where the control system is adapted for activating or deactivating the gas supply.

In this relation the best cooling effect is obtained when the channels are arranged in the calibrator block.

In a more preferred embodiment the calibrator block has an outer surface facing and facing the insulating material at least in close proximity, and where the channels at least partly are formed by recesses in the outer surface of the calibrator block.

In this way the channels are arranged as far away from the cavity as possible, and the heat elements are thereby arranged between the cavity for the probe and the channels, so that the temperature homogeneity in the block around the cavity is as good as possible.

In order to obtain the best cooling effect it is preferred in this relation that a plurality of recesses are arranged in parallel to each other to form cooling ribs between them.

An efficient and at the same time relatively simple cooling can be obtained if the gas supply can advantageously comprise a blower for forcing air through the channels.

In this relation it is especially advantageous if at least a part of each channel has a cross section having a smallest transverse dimension being smaller than 10 mm. and preferably smaller than 7 mm. Thereby reducing natural convection significantly.

As an alternative the gas supply can comprise an orifice having a opening being so small that it significantly restricts the flow of air through the channels when the blower is off, or the channels or the gas supply can comprise one or more valves being arranged for closing and opening the gas flow, and in this last mentioned relation the control system can be adapted or arranged for controlling the valves.

The present invention can be used with calibration blocks made from different alloys, but it is especially advantageous in relation to the use of a calibration block at least partly being made of an aluminium-bronze alloy having less than 8.5 weight percent (wt %) of aluminium, and having a microstructure that contains only alpha phase.

According to the invention a method of calibrating a temperature probe is also suggested, the method comprising inserting the temperature probe in a calibrator block having an cavity for receiving the temperature probe and being at least partly surrounded by thermally insulating material, heating the calibrator block to a selected temperature, calibrating the temperature probe at the selected temperature, and cooling the calibrator block, and where the cooling of the calibrator block is done by forcing gas such as air through one or more channels arranged in the calibrator block or the insulating means.

A calibrator block is also suggested for use in a temperature calibration device according to the present invention, and where the calibrator block comprises a cavity adapted for receiving a temperature probe, at least one cavity each for receiving a heating element, and a number of cannels being arranged in the calibrator block for conducting gas for cooling the calibrator block.

In this relation it is especially advantageous as mentioned above, when the channels are formed by recesses arranged on the outer surface of the calibrator block, so that the channels are arranged as far away from the cavity as possible, and the heat elements are thereby arranged between the cavity for the probe and the channels, so that the temperature homogeneity in the block around the cavity is as good as possible.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 2 shows a side view of the calibrator unit shown in FIG. 1.

FIG. 3 shows a cross section of the calibrator unit along the line A-A in FIG. 2

FIG. 4 shows another cross section of the calibrator unit shown in FIG. 2 along the line B-B.

DETAILED DESCRIPTION OF THE EMBODIMENTS

Figure 5:
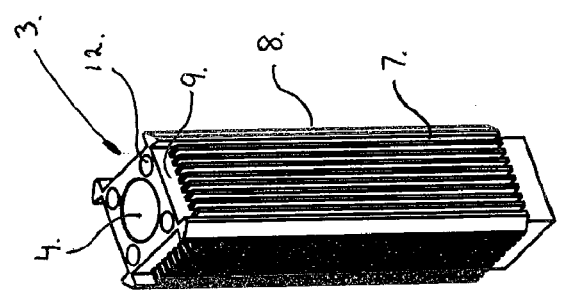
FIG. 5 shows a perspective view of a calibrator block according to the invention.
Figure 1:
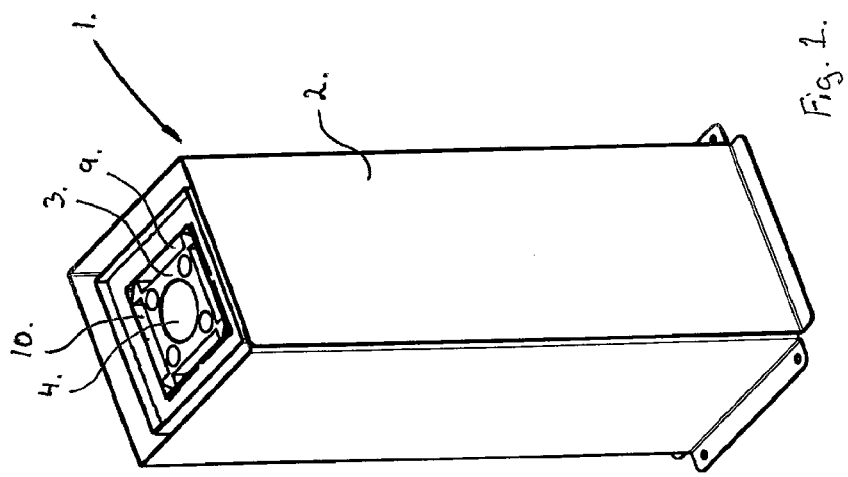
FIG. 1 shows a perspective view of a dry well calibrator unit according to the present invention.

A Dry well calibration unit is described below with reference to the drawings. It is, however, to be noted that this unit in practical use will be a part of a complete calibration apparatus comprising e.g. a housing; control circuitry; Power supply; programming keyboard as well as other equipment necessary or nice to have for performing the process of calibrating a probe. Some of this is described in more detail e.g. in the drawings and the corresponding parts of the description of US patent application no. 2007/0291814 which is hereby incorporated by reference.

The dry well unit 1 shown in FIGS. 1, 2, 3 and 4 comprises a housing 2 containing a centrally arranged calibration block 3 having a central bore 4 for receiving a temperature probe or an insert having a temperature probe placed therein. In this figure and in the following the calibrator block is shown only with this central bore, and it is evident for the skilled person that the calibrator block may or may not comprise a separate insert adapted for ensuring contact between a specific temperature probe that is to be calibrated and the calibrator block. In this regard any insert adapted to be placed in the central bore 4 is to be understood as being a part of the calibrator block 3 as such.

Between the calibrator block 3 and the housing 2 the calibrator unit 1 comprises supporting material 5 for supporting the calibrator block 3 inside the housing 2. In order to thermally insulate the calibrator block 3 this support material 5 is advantageously selected so that it provides efficient thermal insulation between the calibrator block 3 and the housing 2.

According to the invention the calibrator unit 1 comprises a fan 6 arranged for cooling down the calibrator block 3 between each calibration process. This fan 6 is connected to a number of channels 9 arranged in the calibrator unit 1 and according to this embodiment of the invention these channels 9 are partly formed by recesses 7 arranged on the outside surface 8 of the calibrator block 3.

In one embodiment of the invention a control system is arranged for activating and deactivating the fan 6. When the fan 6 is activated it blows air from around the calibrator unit 1, and through the channels 9 and out through an opening 10 arranged near the upper end of the calibrator block 3. In this embodiment the channels are formed by recesses 8 having a rectangular cross section, and where the smallest cross dimension is smaller than 10 mm. or preferably smaller than 7 mm. in order to reduce natural convection in the channels to a minimum.

In another embodiment the control system is arranged for controlling at least one valve being arranged in the channels 9 for closing or opening for the air flow provided by the fan 6. In this embodiment the control system may or may not control the fan, as the fan can advantageously be used for primarily cooling the space around the calibrator unit when the valve is closed, and for cooling also the calibrator block 3 when the valve is open.

The control system as such is not shown in the figures as it is evident to the skilled person how to adapt a control system for the purposes mentioned above. In this regard it would be obvious for the skilled person to adapt the control system already used for controlling the functions of the calibrator device, such as the one described in the above mentioned US patent application no. 2007/0291814 so that it also controls the flow through the cannels 9 according to the calibration cycle, and hence so that air is flowing through the channels 9 only between the calibration processes.

On FIG. 5 a calibrator block 3 according to the invention is shown having a central bore 4 for receiving an insert or a temperature probe (nor shown) in close thermal contact with the calibrator block 3. Four more bores 12 are arranged in parallel to the central bore 4 for receiving heat elements for heating the calibrator block 3. According to the invention the calibrator block has multiple recesses 8 made in its outer surface, and these recesses 8 form at least part of the above mentioned channels 9 for cooling the calibrator block when gas, such as air, is forced through the recesses 8 forming the channels 9.

As mentioned above it is to be noted that the figures and the above description have shown the example embodiments in a simple and schematic manner. The fine structural details of a complete calibration apparatus have not been shown since the person skilled in the art should be familiar with these details and they would just unnecessarily complicate this description and the figures.

The invention claimed is:

1. A temperature calibration device, comprising:
    a calibrator block having a cavity and one or more heating elements and at least one temperature sensor being thermally coupled to the calibrator block, wherein the heating elements and the temperature sensor are connected to a control system being adapted for controlling the temperature of the calibrator block;
    wherein the calibrator block is at least partly surrounded by a thermally insulating material; and
    a gas supply comprising a blower, wherein:
        the calibrator block includes surface structure to form a number of channels between the calibrator block and the thermally insulating material;
        the control system is connected to the gas supply and adapted for activating or deactivating the gas supply;
        the blower is provided for forcing gas through the channels;
        the control system is arranged for controlling the blower; and
        at least a part of each channel has a cross section having a smallest transverse dimension being smaller than 10 mm.

2. A temperature calibration device according to claim 1, wherein the channels are arranged in the calibrator block.

3. A temperature calibration device according to claim 2, wherein the calibrator block has an outer surface facing the thermally insulating material and the channels are at least partly formed by recesses in the outer surface of the calibrator block.

4. A temperature calibration device according to claim 3, wherein the plurality of recesses are arranged in parallel to each other to form cooling ribs between them.

5. A temperature calibration device according to claim 1, wherein at least a part of each channel has a cross section having a smallest transverse dimension being smaller than 7 mm.

6. A temperature calibration device according to claim 1, wherein the calibration block at least partly is made of an aluminium-bronze alloy having less than 8.5 weight percent (wt. %) of aluminium.

7. A temperature calibration device according to claim 6, wherein the aluminium-bronze alloy has a microstructure that contains only alpha phase.

8. A method of calibrating a temperature probe, the method comprising:
inserting the temperature probe in a calibrator block having a cavity for receiving the temperature probe and being at least partly surrounded by thermally insulating material,
heating the calibrator block to a selected temperature,
calibrating the temperature probe at the selected temperature, and
cooling the calibrator block by means of a blower forcing gas through surface structure in the calibrator block forming a number of channels between a the calibrator block and the thermally insulating material, wherein a control system controls the blower and at least a part of each channel of the number of channels has a cross section having a smallest transverse dimension being smaller than 10 mm.

9. The method according to claim 8, wherein at least a part of each channel has a cross section having a smallest transverse dimension being smaller than 7 mm.

10. A calibrator block for use in a temperature calibration device, and comprising a cavity adapted for receiving a temperature probe, at least one cavity each for receiving a heating element, wherein a number of channels are arranged in the calibrator block for conducting gas for cooling the calibrator block.

11. A calibrator block according to claim 10, wherein the channels are formed by recesses arranged on the outer surface of the calibrator block.

12. A temperature calibration device, comprising:
a calibrator block having a cavity, one or more heating elements, at least one temperature sensor thermally coupled to the calibrator block, and a gas supply comprising a blower, wherein:
the one or more heating elements and the at least one temperature sensor are connected to a control system adapted to control the temperature of the calibrator block,
the calibrator block is at least partly surrounded by thermally insulating material,
the calibrator block includes surface structure to form a number of channels between the calibrator block and the insulation material,
the blower is provided for forcing air through the channels,
the control system is connected to the gas supply and adapted for activating or deactivating the gas supply by controlling the blower, and
the gas supply comprises an orifice having an opening being so small that it restricts the flow of air through the channels when the blower is off.

13. A temperature calibration device, comprising:
a calibrator block having a cavity, one or more heating elements, at least one temperature sensor being thermally coupled to the calibrator block, and a gas supply, wherein
the one or more heating elements and the at least one temperature sensor are connected to a control system being adapted for controlling the temperature of the calibrator block,
the calibrator block is at least partly surrounded by thermally insulating material,
the calibrator block includes surface structure to form a number of channels between the calibrator block and the insulation material,
the channels or the gas supply comprises one or more valves for closing and opening the gas flow, and
the control system is connected to the gas supply and adapted for activating or deactivating the gas supply by controlling the valves.

14. A method of calibrating a temperature probe, the method comprising:
inserting the temperature probe in a calibrator block having a cavity for receiving the temperature probe and being at least partly surrounded by thermally insulating material,
heating the calibrator block to a selected temperature;
calibrating the temperature probe at the selected temperature, and
cooling the calibrator block by means of a blower forcing gas from a gas supply through surface structure in the calibrator block forming a number of channels between the calibrator block and the thermally insulating material, wherein the gas supply is controlled by activating or deactivating the gas supply, a control system controls the blower, and the gas supply comprises an orifice having an opening small enough to restricts the flow of air through the channels when the blower is off.

15. A method of calibrating a temperature probe, the method comprising:
inserting the temperature probe in a calibrator block having a cavity for receiving the temperature probe and being at least partly surrounded by thermally insulating material,
heating the calibrator block to a selected temperature,
calibrating the temperature probe at the selected temperature, and
cooling the calibrator block by forcing gas from a gas supply through surface structure forming in the calibrator block a number of channels between the calibrator block and the thermally insulating material, wherein the gas supply is controlled by activating or deactivating the gas supply, the channels or the gas supply comprise one or more valves for closing and opening gas flow, and the control system controls the valves.

* * * * *

UNITED STATES PATENT AND TRADEMARK OFFICE
CERTIFICATE OF CORRECTION

PATENT NO. : 8,721,173 B2  
APPLICATION NO. : 13/201958  
DATED : May 13, 2014  
INVENTOR(S) : Harslund et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this
Twenty-ninth Day of September, 2015

Michelle K. Lee
*Director of the United States Patent and Trademark Office*